(12) United States Patent
Laventman et al.

(10) Patent No.: US 10,395,188 B2
(45) Date of Patent: Aug. 27, 2019

(54) MAPPING PORTAL APPLICATIONS IN MULTI-TENANT ENVIRONMENT

(71) Applicant: INTERNATIONAL BUSINESS MACHINES CORPORATION, Armonk, NY (US)

(72) Inventors: Gennady Laventman, Haifa (IL); Randy A. Rendahl, Raleigh, NC (US); Amber Roy-Chowdhury, Newcastle, WA (US); Alexey Roytman, Givat Elah (IL)

(73) Assignee: INTERNATIONAL BUSNIESS MACHINES CORPORATION, Armonk, NY (US)

( * ) Notice: Subject to any disclaimer, the term of this patent is extended or adjusted under 35 U.S.C. 154(b) by 280 days.

(21) Appl. No.: 14/089,967

(22) Filed: Nov. 26, 2013

(65) Prior Publication Data
US 2014/0089155 A1  Mar. 27, 2014

Related U.S. Application Data

(63) Continuation of application No. 12/194,172, filed on Aug. 19, 2008, now Pat. No. 8,615,400.

(51) Int. Cl.
| | |
|---|---|
| *G06Q 10/06* | (2012.01) |
| *G06Q 20/14* | (2012.01) |
| *G06Q 30/02* | (2012.01) |
| *G06Q 30/04* | (2012.01) |
| *G06Q 40/00* | (2012.01) |

(52) U.S. Cl.
CPC .......... *G06Q 10/06* (2013.01); *G06Q 20/145* (2013.01); *G06Q 30/02* (2013.01); *G06Q 30/0283* (2013.01); *G06Q 30/04* (2013.01); *G06Q 40/12* (2013.12)

(58) Field of Classification Search
CPC ........ G06Q 30/02; G06Q 30/04; G06Q 40/12; G06Q 10/06; G06Q 30/0283; G06Q 20/145
See application file for complete search history.

(56) References Cited

U.S. PATENT DOCUMENTS

| | | |
|---|---|---|
| 6,327,619 B1 | 12/2001 | Blumenau |
| 6,604,123 B1 | 8/2003 | Bruno et al. |

(Continued)

OTHER PUBLICATIONS

Alwis, W. N. T., and C. D. Gamage. "A multi-tenancy aware architectural framework for SaaS application development." Engineer: Journal of the Institution of Engineers, Sri Lanka 46.3 (2013).*
Espadas, Javier, et al. "A tenant-based resource allocation model for scaling Software-as-a-Service applications over cloud computing infrastructures." Future Generation Computer Systems 29.1 (2013): 273-286.*

(Continued)

*Primary Examiner* — Asfand M Sheikh
(74) *Attorney, Agent, or Firm* — Jay Wahlquist; Andrew M. Calderon; Roberts Mlotkowski Safran Cole & Calderon, P.C.

(57) ABSTRACT

A method implemented in a computer infrastructure having computer executable code tangibly embodied on a computer readable medium being operable to associate each of a plurality of tenants with a respective virtual portal and individually meter virtual portal usage at each respective virtual portal. Additionally, the computer executable code is operable to determine a fee amount for the each of the plurality of tenants based on the individually metered virtual portal usage.

17 Claims, 5 Drawing Sheets

(56) References Cited

U.S. PATENT DOCUMENTS

| | | |
|---|---|---|
| 7,269,632 B2 | 9/2007 | Edeker et al. |
| 7,310,671 B1 | 12/2007 | Hassell et al. |
| 7,370,364 B2 | 5/2008 | Dobbins et al. |
| 7,685,224 B2 | 3/2010 | Nye |
| 7,702,779 B1 | 4/2010 | Gupta et al. |
| 8,615,400 B2 * | 12/2013 | Laventman ............ G06Q 10/06 705/1.1 |
| 2002/0107891 A1 | 8/2002 | Leamon et al. |
| 2002/0111848 A1 | 8/2002 | White |
| 2003/0115316 A1 | 6/2003 | Yang-Huffman |
| 2003/0195860 A1 | 10/2003 | Ball |
| 2004/0023722 A1 | 2/2004 | Vuong et al. |
| 2004/0078371 A1 | 4/2004 | Worrall et al. |
| 2005/0256940 A1 | 11/2005 | Henderson et al. |
| 2009/0177761 A1 | 7/2009 | Meyer et al. |
| 2011/0153684 A1 | 6/2011 | Yung |

OTHER PUBLICATIONS

Del Vecchio, David et al. "Evaluating Grid Portal Security", Nov. 2006, pp. 1-14.

Corcho, Oscar et al., "A Platform for the Development of Semantic Web Portals", ICWE Jul. 11-14, 2006, pp. 145-152.

Kindberg, Tim et al., "People, Places, Things: Web Presence for the Real World", Mobile Networks and Applications 7, pp. 365-376, 2002.

Diaz, Oscar et al., "Improving Portlet Interoperability Through Deep Annotation", May 10-14, 2005, pp. 372-381.

Hurek, Thomas et al., "Creating portal instances on demand", Feb. 23, 3005, pp. 1-9, URL:http://www.ibm.com/developerworks/websphere/library/techarticles/0502_hurek/0502_hurek.html.

"Virtual Portals", pp. 1-2, URL: http://support.packeteer.com/documentation/packetguide/rc3.1/advanced/virtual.portals.htm.

* cited by examiner

MAPPING PORTAL APPLICATIONS IN MULTI-TENANT ENVIRONMENT

FIELD OF THE INVENTION

The present invention generally relates to web portal applications, and more particularly, to a method and system for mapping portal applications in a multi-tenant environment.

BACKGROUND

A web portal is a site that provides, for example, a single function via a web page or site. Web portals often function as a point of access to information on the World Wide Web. Portals present information from diverse sources in a unified way. Additionally, web portals allow, e.g., partners, employees and customers to chose their user experience, with personalized applications based on role, context, actions, location, preferences and/or team collaboration needs. The present invention uses a more narrow definition of web portal, in that it refers to Web servers that support the portlets technology.

Portlets are pluggable user interface components that are managed and displayed in a web portal. The latest portlets definition was done by the Java Specification Request (JSR) 168. Portlets produce fragments of markup code that are aggregated into a portal page. Typically, following the desktop metaphor, a portal page is displayed as a collection of non-overlapping portlet windows, where each portlet window displays a portlet. Hence a portlet (or collection of portlets) resembles a web-based application that is hosted in a portal. Some examples of portlet applications are email, weather reports, discussion forums, and news.

Portal servers are becoming more and more popular in hosted multi-tenant systems. A tenant is a subscriber to the web hosting environment and utilizes a web portal. For example, the tenant may be an enterprise which purchases information technology (IT) infrastructure, e.g., an organization. Moreover, it should be understood that the tenant is not the user of the web portal. Rather, it is the end-user (or client), e.g., a member of the organization, who utilizes the web portal. Multi-tenancy refers to the architectural principle, where, for example, a single instance of software runs on a software-as-a-service (SaaS) vendor's servers, serving multiple tenants, e.g., organizations.

With a multi-tenant architecture, a software application may be designed to virtually partition its data and configuration so that each client organization works with a customized virtual application instance or virtual portal. That is, virtual portals are logical portals that share, for example, the same hardware and software installation. A virtual portal server, for example, an IBM® WebSphere® Portal server, allows the creation and management of multiple virtual portals. (IBM and WebSphere are trademarks of International Business Machines Corporation in the United States, other countries, or both.) Other portal servers have similar functionality with different names, such as, for example, Sharepoint® portal SiteArea, and eXo. (Sharepoint is a registered trademark of Microsoft Corporation in the United States and other countries.) The virtual portals may be established by partitioning a single installation into independent, logical servers. End users are unable to distinguish whether their request is served by a full portal installation or by a virtual portal, which has been defined within the shared environment. Virtual portals simplify administration, for example, by reducing the number of parallel installations, and they help avoid the requirement for redundant hardware.

Tenants may be charged a fee for usage of the web portal server, e.g., for a portlet application. The amount of the fee may be determined with usage metering of, e.g., a portal server and/or a portlet application. However, in multi-tenant systems, for example, the same server and in some cases the same portal applications may be shared between several tenants. Within this context, the portlet application's usage continues to require usage metering information for input to the tenant's remuneration determination. Therefore, the usage metering information needs to be associated with the corresponding tenant.

There are several methods for associating usage metering data with a corresponding tenant. Some of these methods include authentication-based mapping, general HTTP or SOAP request parameter-based mapping, and application separation. However, these approaches have various disadvantages. For example, authentication-based mapping assumes access to a common authentication database. However, in many cases the authentication may be done by a third party component without access to the common authorization database. Thus, with this scenario, the third party component cannot perform the authentication-based mapping. Furthermore, the addition of HTTP or SOAP request parameters has the drawback of requiring changes in the Web Service stack or application level code changes. Additionally, application separation prevents application/middleware sharing and, thus, limits the multi-tenancy options.

SUMMARY

In a first aspect of the invention, a method is implemented in a computer infrastructure having computer executable code tangibly embodied on a computer readable medium. The computer executable code tangibly embodied on a computer readable medium is operable to associate each of a plurality of tenants with a respective virtual portal and individually meter virtual portal usage at each respective virtual portal. Additionally, the computer executable code is operable to determine a fee amount for the each of the plurality of tenants based on the individually metered virtual portal usage.

In another aspect of the invention, a system comprises a virtual portal creation tool configured to create a distinct virtual portal associated with each individual tenant. Furthermore, the system comprises a hosting security tool configured to allow a user of an individual tenant to access the individual tenant's distinct virtual portal. Additionally, the system comprises a logging/metering tool configured to perform a metering of usage of the individual tenant's distinct virtual portal. Further, the logging/metering tool is configured to determine a remuneration amount for the individual tenant based on the metering.

In an additional aspect of the invention, a computer program product comprising a computer usable medium having readable program code embodied in the medium is provided. The computer program product includes at least one component operable to associate each of a plurality of tenants with one of a corresponding plurality of virtual portals and individually meter virtual portal usage at each of the plurality of virtual portals. Additionally, the at least one component is operable to determine a remuneration amount for the each of the plurality of tenants based on the individually metered virtual portal usage.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to portal applications, and more particularly, to a method and system for mapping portal applications in a multi-tenant environment. The present invention discloses a method and system for mapping usage-based metering data from the same or different portal applications, without application programmer intervention. More specifically, the present invention utilizes a one-to-one mapping between a tenant and a virtual portal in order to determine usage-based metering data for each tenant.

By implementing the present invention, the mapping of the metering data to a specific tenant can be based on the virtual portal properties used to serve that specific tenant. Moreover, by implementing the present invention, the remuneration owed by a tenant may be determined without requiring access to a common authentication database or a third party component. Additionally, implementing the present invention does not require changes in the Web (Portlet) container stack or application level code, which may limit multi-tenancy options.

System Environment

Figure 1:
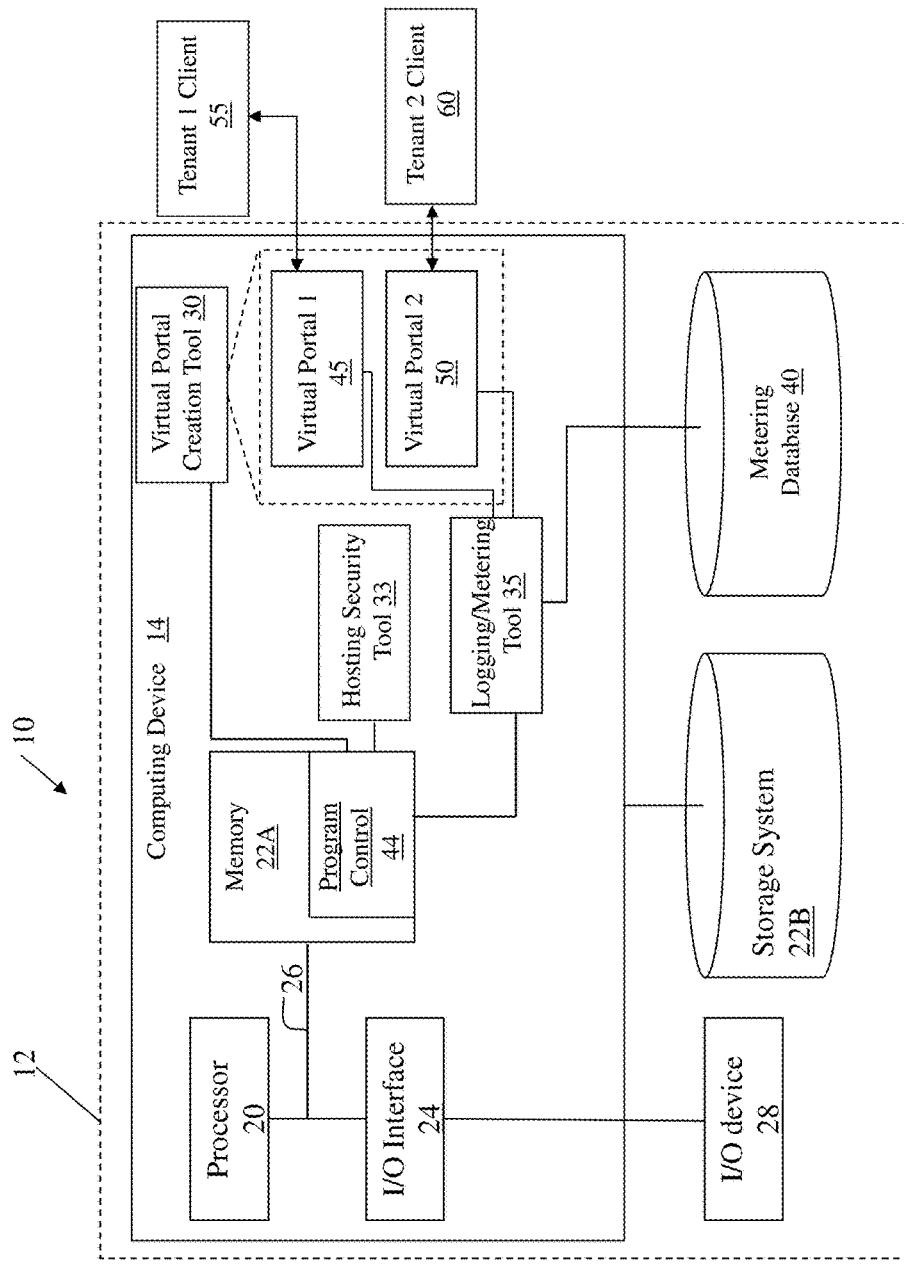
FIG. 1 shows an illustrative environment for implementing the steps in accordance with the invention.

FIG. 1 shows an illustrative environment 10 for managing the processes in accordance with the invention. To this extent, the environment 10 includes a computer infrastructure 12 that can perform the processes described herein. The computer infrastructure 12 includes a computing device 14 that comprises a virtual portal creation tool 30 a hosting security tool 33 and a logging/metering tool 35. These tools are operable to provide virtual portals, authenticate and authorize a user and redirect the user to their tenant specific virtual portal, and determine usage-based metering data, e.g., the processes described herein. For example, as shown in FIG. 1, with this exemplary embodiment, the virtual portal creation tool 30 has provided two virtual portals 45 and 50, as described further below. Moreover, FIG. 1 shows two clients (tenant one client 55 and tenant two client 60) accessing a web portal via their own respective virtual portals, as described further below.

The computing device 14 includes a processor 20, a memory 22A, an input/output (I/O) interface 24, and a bus 26. The memory 22A can include local memory employed during actual execution of program code, bulk storage, and cache memories which provide temporary storage of at least some program code in order to reduce the number of times code must be retrieved from bulk storage during execution. Further, the computing device 14 is in communication with an external I/O device/resource 28. The I/O device 28 can interact with the computing device 14 or any device that enables the computing device 14 to communicate with one or more other computing devices using any type of communications link. The external I/O device/resource 28 may be keyboards, displays, pointing devices, etc. Additionally, in embodiments, the computing device 14 includes a storage system 22B. Furthermore, in embodiments, the computing device 14 and/or the computing environment 12 includes a metering database 40, as discussed further below.

The processor 20 executes computer program code (e.g., program control 44) processes (which, for example, instruct the virtual portal creation tool 30 and the logging/metering tool 35) on computer media, which is stored in memory 22A and/or storage system 22B. While executing computer program code, the processor 20 can read and/or write data to/from memory 22A, storage system 22B, metering database 40 and/or I/O interface 24. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a server cluster) that communicate over any type of communications link, such as a network, a shared memory, or the like, to perform the processes described herein. Further, while performing the processes described herein, one or more computing devices in the computer infrastructure 12 can communicate with one or more other computing devices external to computer infrastructure 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

Shared Tenant Environment

Figure 2:
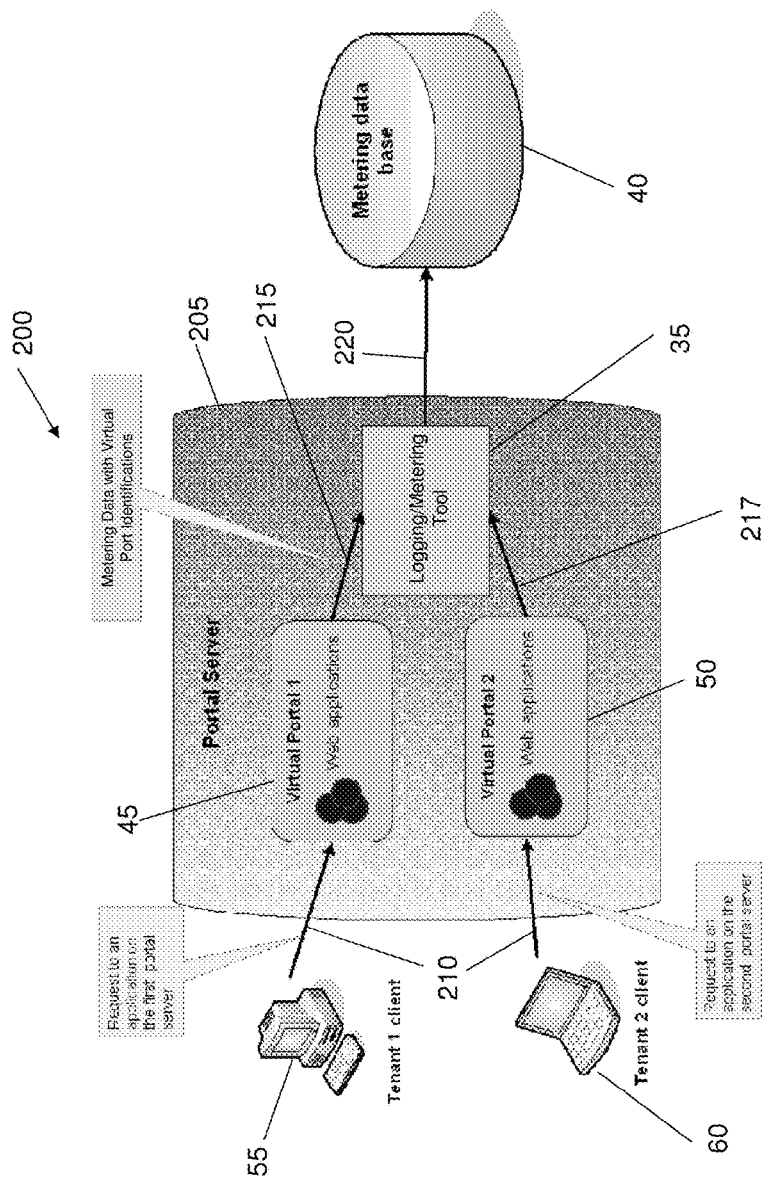
FIG. 2 shows an exemplary shared tenant environment in accordance with the present invention.

FIG. 2 shows an exemplary shared tenant environment 200 in accordance with aspects of the present invention. As shown in FIG. 2, the exemplary shared tenant environment 200 includes two virtual portals 45 and 50 supporting tenant distribution. However, it should be understood that the present invention contemplates that a shared tenant environment may include any number of shared tenants, and thus, any number of virtual portals. According to an aspect of the invention, a one-to-one mapping between tenant and virtual portal may be defined, so the virtual portal's unique properties may be used to map request metered information to the correct tenant. That is, every virtual portal has distinct identifying properties and, in some cases, a unique (uniform resource locator) URL prefix, and these distinct identifying properties may be used to associate the virtual portal with the tenant.

Additionally, it should be understood that a tenant is a subscriber to the hosting environment. For, example, the tenant may be an enterprise which purchases information technology (IT) infrastructure. That is, the tenant is not the end-user. Rather, a client, who is, for example, an employee of the tenant, may be an end-user of the virtual portal.

As should be understood by one of ordinary skill in the art, the virtual portals may be configured to contain Web applications. In embodiments, the applications may be portal-proprietary applications or may be applications shared between portals/tenants. For example, portal servers may allow the separation of distinct Web applications and their portlets between several virtual portals.

As shown in FIG. 2, a tenant one client 55 is connected to their tenant's associated virtual portal, virtual portal one 45, by connection 210 via the hosting security tool 33. Upon connection (or at some point subsequent to connection) to virtual portal one 45, metering data 215 is sent from virtual portal one 45 to the logging/metering tool 35. The metering data 215 for tenant one's usage contains properties, e.g., a virtual portal identification, indicating virtual portal one 45, thus associating the metering data 215 for tenant one's usage with the virtual portal one 45, as discussed further below. Additionally, as shown in FIG. 2, a tenant two client 60 is connected to their tenant's associated virtual portal, virtual portal two 50, by connection 210 via the hosting security tool 33, and the metering data 217 for their request is sent to the logging/metering tool 35. Moreover, the metering data 217 contains properties indicating virtual portal two 50, e.g., a virtual portal identification, thus associating the metering data 217 of the tenant two client 60 with virtual portal two 50.

In embodiments, the metering data 215 and 217 may be created, for example, through common logging, extracted by the logging/metering tool 35 and combined in the metering database 40 (which, in embodiments, may be contained in storage system 22B). In embodiments, the logging/metering tool 35 may measure virtual portal usage using various methods. For example, in embodiments, metering may be based on a total session time of virtual portal usage. Additionally, in embodiments, metering may be based on a number of log-ins, a number of concurrent users, and transaction counts for different actions (e.g., each Web search utilizing a particular search engine), amongst other metering methods. The granularity of the metering data and the data creation mechanisms (e.g., Servlet or portlet filters, portal infrastructure) are beyond the scope of the present invention.

Thus, according to an aspect of the invention, a one-to-one mapping between tenant and virtual portal may be defined, so the virtual portal's unique properties may be used to map request metered information to the correct tenant. In embodiments, a deployment process may be utilized in order to define the one-to-one mapping. For example, during a deployment process, a virtual portal may be created and application distribution determined, as described further below. Moreover, according to an aspect of the invention, the same deployment activity can register the relationship of tenant/application to virtual portal, enabling the appropriate usage metering mapping for the logging/metering tool 35. That is, the association of a tenant with a particular virtual portal may be defined and registered during the deployment process.

Thus, individual tenant metering data may be separately determined based on the virtual portal properties, e.g., virtual portal identifications. Then, in accordance with an aspect of the invention, the individual tenant usage can be determined, and the tenant's fee amount can be based on usage of the corresponding virtual portal. Moreover, according to an aspect of the invention, the mapping of virtual portal metering data may be transparent to, e.g., the end users and/or program developers.

Flow Diagrams

Figure 3:
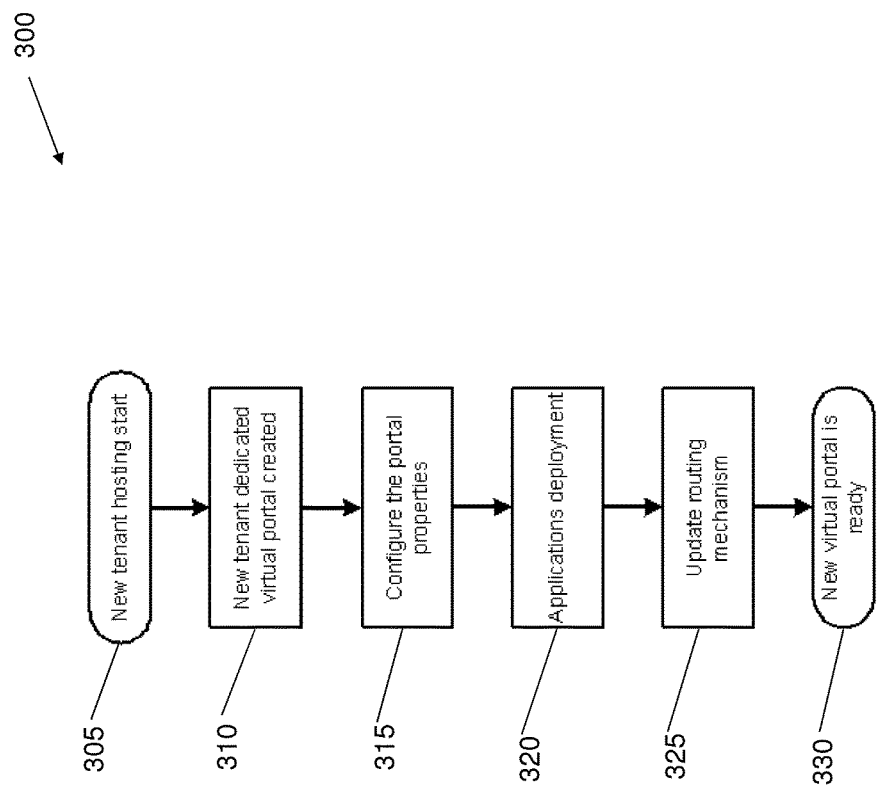
FIGS. 3-5 show exemplary flows for performing aspects of the present invention.
Figure 4:
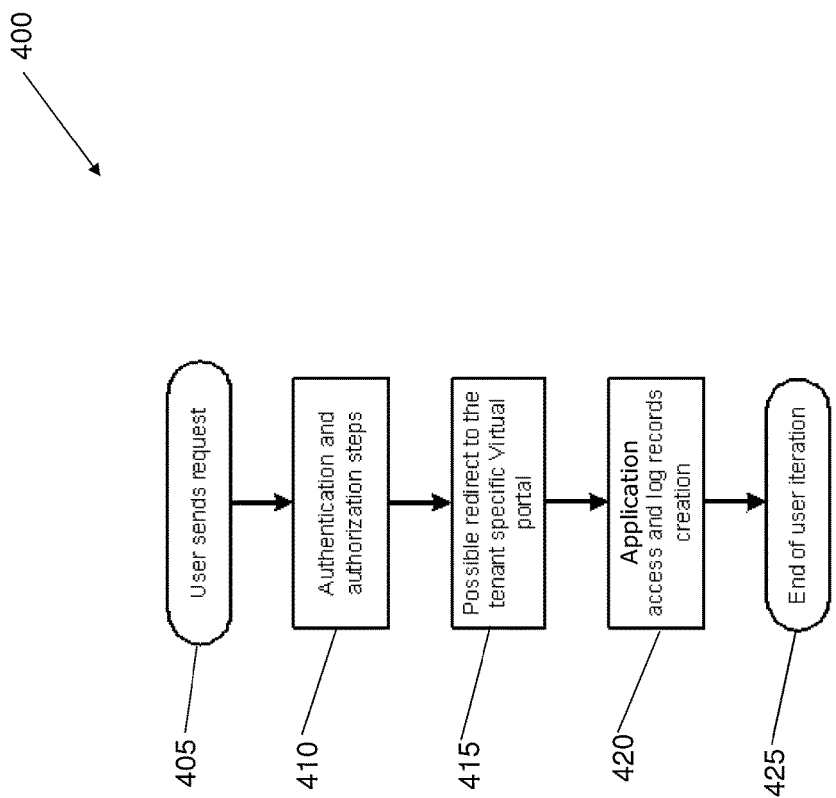
Figure 5:
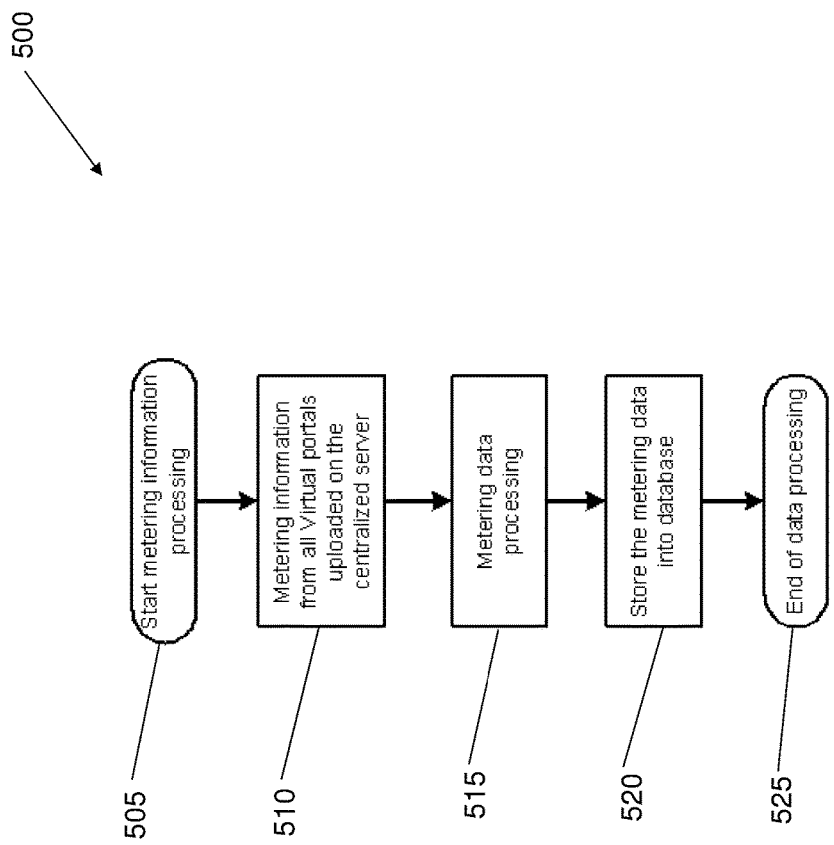

FIGS. 3-5 show exemplary flows for performing aspects of the present invention. The steps of FIGS. 3-5 may be implemented in the environment of FIG. 1, for example. The flow diagrams may equally represent high-level block diagrams of the invention. The flowchart and/or block diagram in FIGS. 3-5 illustrate the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Establishing New Virtual Portal for New Tenant Hosting

FIG. 3 shows an exemplary flow 300 for establishing a new virtual portal for new tenant hosting in accordance with the present invention. At step 305, a new tenant hosting process is commenced. At step 310, the virtual portal creation tool creates a new tenant dedicated virtual portal. At step 315, the virtual portal creation tool configures the virtual portal properties. For example, in embodiments, the virtual portal properties may contain a direct tenant specification (e.g., an identification (ID) or a name, amongst other direct tenant specifications). Additionally, in embodiments the portal properties may contain an indirect, external datasource-based reference to the tenant to specify the tenant for that virtual portal.

At step 320, the virtual portal creation tool deploys applications to the new virtual portal. At step 325, the virtual portal creation tool updates a routing mechanism to reflect the relationship between the tenant and the new virtual portal. The routing mechanism allows end users (e.g., employees of the tenant) to connect to the virtual portal. In embodiments, the routing mechanism may be a unique universal resource locator (URL) or may be a redirect mechanism during an authentication process, e.g., an internet protocol (IP) router redirect. At step 330, the new virtual portal is ready for use by the tenant (or a client, e.g., employee, thereof).

User Request Processing

FIG. 4 shows an exemplary flow 400 for user (or client) request processing in accordance with the present invention. At step 405, a user sends a request for processing. At step 410, the hosting security tool authenticates and authorizes the user.

In embodiments, at optional step 415, the hosting security tool redirects the user to their tenant specific virtual portal. However, as redirection may not be required in all embodiments (e.g., those embodiments using a unique URL), step 415 may be an optional step. At step 420, the logging/metering tool creates an application access and log record, e.g., in the metering database, for containing the metering data (e.g., for a particular virtual portal usage session), which, for example, is subsequently collected, as described below. At step 425, the process ends.

Metering Information Processing

FIG. 5 shows an exemplary flow 500 for metering information processing in accordance with the present invention. At step 505, a metering process is commenced. At step 510, metering information (e.g., the usage data captured during exemplary flow 400) from all of the virtual portals of the system are uploaded on a centralized server, e.g., the logging and metering tool. At step 515, the logging/metering tool processes the metering data. In embodiments, step 515 may include the logging/metering tool mapping from a virtual portal to a tenant.

Additionally, in embodiments, step 515 may include the logging/metering tool performing additional stages, for example, filtering and/or aggregation, amongst other additional stages. For example, aggregation may include the logging/metering tool aggregating usage data for all clients of a tenant, such that, e.g., a tenant receives a single invoice for all of their clients' virtual portal usage. Filtering (or data reduction) may include, for example, the logging/metering tool removing some records that may not be pertinent to the virtual portal usage determination. For example, in embodiments, the logging/metering tool may reduce full log records of virtual portal usage to, e.g., the durations of virtual portal usage, in order to reduce the storing of data that may be unnecessary.

At step 520, the logging/metering tool stores the metering data in a database (e.g., the metering database). At step 525, the processing ends. According to an aspect of the invention, as described above, the metering data may be used for billing the tenant for their virtual portal usage. This is done by associating the metering data of a particular virtual portal to the tenant exclusively assigned to that particular virtual portal. Additionally, in embodiments, the metering data may be used for additional tasks, e.g., for service level agreement (SLA) inspection and capacity planning, amongst other additional tasks. For example, the metering data will indicate an amount of individual usage by a number of tenants. This information may be used to determine if extra capacity may be needed, e.g., for a particular tenant, or too much capacity is available, such that capacity is not being utilized efficiently.

It should be understood, that while the steps of FIGS. 3-5 have been described as occurring in a particular order, the invention contemplates that the steps may be performed in other orders. Furthermore, the invention contemplates that, in embodiments, steps may be implied or omitted while still remaining true to this invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable memory or device being operable to:

create a plurality of virtual portals which correspond with a plurality of tenants;

configure each of the virtual portals with one or more virtual properties which comprise an indirect external data-source-based reference to an associated tenant and a direct tenant specification which includes an identification (ID);

associate each of the plurality of tenants with a respective virtual portal based on one or more virtual portal properties of the respective virtual portal using a processor of the computer infrastructure;

deploy portal proprietary applications associated with each of the plurality of tenants to each respective said virtual portal;

route one or more clients associated with each of the plurality of tenants to the deployed portal proprietary applications of the respective virtual portals associated with each of the plurality of tenants;

individually meter virtual portal usage by the one or more clients of the portal proprietary applications at each respective virtual portal;

perform data filtration by reducing full log records of the individually meter virtual portal usage to the durations of virtual portal usage at each respective virtual portal;

perform data aggregation by aggregating user data for all of the one or more clients virtual portal usage at each of the plurality of tenants associated with each respective virtual portal;

determine a first fee amount for the each of the plurality of tenants based on the reduced full log records of the individually metered virtual portal usage by the one or more clients associated with each of the plurality of the tenants;

determine a second fee amount for the each of the plurality of tenants based on the aggregated user data for all of the one or more client virtual portal usage at each of the plurality of tenants associated with each respective virtual portal; and determine capacity utilization based on the individually metered virtual portal usage by the one or more clients associated with each of the plurality of tenants, wherein each respective virtual portal is configured to comprise at least one web application, and the individually metering virtual portal usage by the one or more clients at each respective virtual portal comprises metering a number of transaction counts for each web search utilizing a specific search engine via the respective virtual portal, a number of log-ins on the respective virtual portal, and a number of concurrent users of the respective virtual portal.

2. The method of claim 1, wherein the associating is a one-to-one mapping of each of the plurality of tenants with a single virtual portal of the plurality of virtual portals, such that each of the plurality of virtual portals is only associated with a particular tenant of the plurality of tenants.

3. The method of claim 1, wherein the one or more virtual portal properties further comprises at least one of:
a virtual portal identification; and
a unique uniform resource locator (URL) prefix.

4. The method of claim 1, further comprising establishing a new virtual portal for a new tenant.

5. The method of claim 1, wherein the associating the each of the plurality of tenants with the respective virtual portal comprises:
configuring the respective virtual portal with an indication of an association with one of the plurality of tenants; and
updating a routing mechanism to reflect the association.

6. The method of claim 5, wherein the routing mechanism comprises one of a unique uniform resource locator (URL) and a redirect mechanism.

7. The method of claim 1, wherein the computer executable code tangibly embodied on the computer readable medium is further operable to:
permit the one or more clients to request web portal usage;
authenticate and authorize the one or more clients of the particular tenant; and
connect the one or more clients to a virtual portal associated with the particular tenant.

8. The method of claim 1, wherein the individually metering virtual portal usage by the one or more clients at each respective virtual portal further comprises metering a total session time of usage by the one or more clients of the respective virtual portal.

9. The method of claim 1, further comprising:
uploading metering information of the one or more clients containing associations between the each of the plurality of tenants and the respective virtual portal; and
storing virtual portal usage data in a database.

10. The method of claim 1, wherein a service provider at least one of creates, maintains, deploys and supports the computer infrastructure that performs the steps of claim 1.

11. The method of claim 1, wherein steps of claim 1 are provided by a service provider on a subscription, advertising, and/or fee basis.

12. A computer system for mapping portal applications, the system comprising:
a processor, a computer readable memory and a computer readable storage media;
program instructions to create a distinct virtual portal associated with each tenant;
program instructions to configure the distinct virtual portal associated with each tenant with one or more virtual properties which comprise an indirect external data-source-based reference to an associated tenant and a direct tenant specification which includes an identification (ID);
program instructions to deploy portal proprietary applications associated with each tenant to each respective said virtual portal;
program instructions to route one or more clients associated with each tenant to the deployed portal proprietary applications of the respective virtual portals associated with each tenant;
program instructions to allow the one or more clients of an individual tenant to access the individual tenant's distinct virtual portal; and
program instructions to perform a metering of usage by the one or more clients of the portal proprietary applications at the individual tenant's distinct virtual portal;
program instructions to perform data filtration by reducing full log records of the metering of usage by the one or more clients to the durations of virtual portal usage at each respective said virtual portal;
program instructions to perform data aggregation by aggregating user data for all of the one or more clients virtual portal usage at each tenant associated with each respective said virtual portal;
program instructions to determine a first fee amount for the individual tenant based on the reduced full log records of the metering of usage by the one or more clients associated with each tenant;
program instructions to determine a second fee amount for the individual tenant based on the aggregated user data for all of the one or more client virtual portal usage at each tenant associated with each respective said virtual portal; and program instructions to determine capacity utilization based on the metering of usage by the one or more clients associated with each tenant, wherein the program instructions are stored on the computer readable storage media for execution by the processor via the computer readable memory, each of the respective virtual portals is configured to comprise at least one web application, and the metering of usage by the one or more clients at each respective said virtual portal comprises metering a number of transaction counts for each web search utilizing a specific search engine via the respective said virtual portal, a number of log-ins on the respective said virtual portal, and a number of concurrent users of the respective said virtual portal.

13. The system of claim 12, wherein the virtual portal creation tool is further configured to:

provide the distinct virtual portal with an indication of its association with the individual tenant; and update a routing mechanism to reflect the association.

14. The system of claim 12, wherein the hosting security tool is further configured to:

permit the one or more clients to request web portal usage;

authenticate and authorize the one or more clients of the individual tenant; and connect the one or more clients to the individual tenant's distinct virtual portal.

15. The system of claim 12, wherein the performing metering of usage by the one or more clients further comprises measuring a total session time of usage of the individual tenant's distinct virtual portal.

16. The system of claim 12, further comprising a metering database configured to store at least one of:

an indicator of the distinct virtual portal associated with each tenant; and virtual portal usage data.

17. A computer program product comprising a computer usable memory having readable program code embodied in the memory, the computer program product includes at least one component operable to:

create a plurality of virtual portals which correspond with a plurality of tenants;

configure each of the virtual portals with one or more virtual properties which comprise an indirect external data-source-based reference to an associated tenant and a direct tenant specification which includes an identification (ID);

associate each of the plurality of tenants with one of a corresponding plurality of virtual portals based on one or more virtual portal properties of the respective virtual portal;

deploy portal proprietary applications associated with each of the plurality of tenants to each corresponding said virtual portal;

route one or more clients associated with each of the plurality of tenants to the deployed portal proprietary applications of the respective virtual portals associated with each of the plurality of tenants;

individually meter virtual portal usage by the one or more clients of the portal proprietary applications at each of the plurality of virtual portals;

perform data filtration by reducing full log records of the individually meter virtual portal usage to the durations of virtual portal usage at each respective virtual portal;

perform data aggregation by aggregating user data for all of the one or more clients virtual portal usage at each of the plurality of tenants associated with each respective virtual portal;

determine a first remuneration amount for the each of the plurality of tenants based the reduced full log records of the individually metered virtual portal usage by the one or more clients associated with each of the plurality of the tenants;

determine a second remuneration amount for the each of the plurality of tenants based on the aggregated user data for all of the one or more clients virtual portal usage at each of the plurality of tenants associated with each respective virtual portal; and determine capacity utilization based on the individually metered virtual portal usage by the one or more clients associated with each of the plurality of tenants, wherein each of the corresponding plurality of virtual portals is configured to comprise at least one web application, and the individually metering virtual portal usage by the one or more clients at each respective virtual portal comprises metering a number of transaction counts for each web search utilizing a specific search engine via the respective virtual portal, a number of log-ins on the respective virtual portal, and a number of concurrent users of the respective virtual portal.

* * * * *